(12) United States Patent
Kuroki et al.

(10) Patent No.: US 6,462,105 B1
(45) Date of Patent: Oct. 8, 2002

(54) ALIPHATIC POLYESTER COMPOSITION FOR MASTERBATCH AND PROCESS FOR PRODUCING ALIPHATIC POLYESTER FILM WITH THE COMPOSITION

(75) Inventors: Takayuki Kuroki, Aichi; Shuhei Ikado, Kanagawa, both of (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/762,267

(22) PCT Filed: Jun. 14, 2000

(86) PCT No.: PCT/JP00/03848

§ 371 (c)(1),
(2), (4) Date: Feb. 6, 2001

(87) PCT Pub. No.: WO01/00730

PCT Pub. Date: Jan. 4, 2001

(30) Foreign Application Priority Data

Jun. 25, 1999 (JP) ............................................. 11-179241
Apr. 24, 2000 (JP) ....................................... 2000-122041

(51) Int. Cl.$^7$ ........................... C08J 3/22; B29C 47/88; C08L 67/08
(52) U.S. Cl. ...................... 523/351; 524/447; 524/451; 524/493; 264/210.7; 264/211.18
(58) Field of Search .......................... 523/351; 524/423, 524/424, 431, 447, 451, 601; 264/210.7, 211.18

(56) References Cited

U.S. PATENT DOCUMENTS 5,744,516 A * 4/1998 Hashitani et al.
5,773,562 A * 6/1998 Gruber et al.
6,180,053 B1 * 1/2001 Claeys et al.

FOREIGN PATENT DOCUMENTS

| JP | 04-504731 | 8/1992 |
| JP | 05-070696 | 3/1993 |
| JP | 05-508669 | 12/1993 |
| JP | 08-034913 | 2/1996 |
| JP | 11-21438 | 1/1999 |

* cited by examiner

*Primary Examiner*—Tae H. Yoon
(74) *Attorney, Agent, or Firm*—Burns Doane Swecker & Mathis LLP

(57) ABSTRACT

An aliphatic polyester composition for a masterbatch which is improved in dispersibility of a filler, anti-blocking property, transparency, molding stability and slipperiness and which is suited for production of an aliphatic polyester film, and a method for producing an aliphatic polyester film using said composition. An aliphatic polyester composition for a masterbatch comprising 100 parts by weight of an aliphatic polyester and 0.1 to 40 parts by weight of an anti-blocking agent and a method for producing an aliphatic polyester film using said composition are provided.

5 Claims, No Drawings

ALIPHATIC POLYESTER COMPOSITION FOR MASTERBATCH AND PROCESS FOR PRODUCING ALIPHATIC POLYESTER FILM WITH THE COMPOSITION

TECHNICAL FIELD

The present invention relates to an aliphatic polyester composition for a masterbatch, and a method for producing an aliphatic polyester film using said composition. More specifically, it relates to an aliphatic polyester composition for a masterbatch which is excellent in dispersibility of an anti-blocking agent and molding stability and which is suited for producing a film having a high transparency, and a method for producing an aliphatic polyester film using said composition.

BACKGROUND OF THE INVENTION

When a film is produced using a resin, anti-blocking agents such as an inorganic filler, a wax and the like are usually added in consideration of molding stability in formation of a film, handling in fabrication of a film and the like. Further, for producing a resin having flexibility, a method in which a plasticizer, an elastomer and the like are added to a resin has been widely used. However, when these softening agents are added, molded products tend to be adhered to each other. Accordingly, an anti-blocking agent has to be added in many cases.

Meanwhile, as a biodegradable thermoplastic resin that is degraded in a natural environment, a lactic acid homopolymer, a copolymer of L-lactic acid and D,L-lactic acid or a copolymer of lactic acid and hydroxycarboxylic acid (these are hereinafter abbreviated generally as lactic acid-based polymers) have been proposed. These polymers are biodegraded by 100% by weight in animal bodies within several months to one year. When they are placed in soil or sea water, the degradation starts under wet atmosphere in several weeks, and the polymers are destroyed in approximately one to several years. Further, a degradation product has a characteristic feature that it is changed into nontoxic lactic acid, carbon dioxide and water.

Lactic acid as a raw material of polylactic acid is produced by a fermentation method or chemical synthesis. Recently, especially L-lactic acid according to a fermentation method has been mass-produced, and it becomes less costly. Further, the resulting polylactic acid has a characteristic feature that rigidity is high. In view of these facts, development of various uses has been currently carried out. Molded products, such as films and the like, obtained by injection molding, extrusion molding, blow molding and the like of these lactic acid-based polymers are excellent in rigidity, but are liable to cause blocking of molded products, and poor handing in use and mechanical adaptability in fabrication. Moreover, when a plasticizer is added to improve flexibility, molded products are more liable to cause blocking, and therefore are poor in handling and fabrication property.

It is known that silica is added to a biodegradable polymer as an inorganic filler. For example, Japanese Patent Laid-Open No. 70,696/1993 and International Patent Publication Nos. 504,731/1992 and 508,669/1993 are mentioned. Japanese Patent Laid-Open No. 70,696/1993 discloses that with respect to a material of a plastic container, a biodegradable plastic such as a poly-3-hydroxybutyrate/poly-3-hydroxyvalerate copolymer, polycaprolactone or polylactic acid is blended with 10 to 40% by weight of calcium carbonate having an average particle diameter of 20 µm or less and hydrous magnesium silicate (talc). Inorganic fillers in large amounts are added to expedite degradation of biodegradable plastics after being discarded.

International Patent Publication No. 504,731/1992 (WO-90/01521) describes that properties such, as hardness, strengths and temperature resistance are changed by adding inorganic fillers such as silica and kaolinite to lactide thermoplastics. Further, in International Patent Publication No. 508,669/1993 (WO-92/01737), calcium silicate and talc are used as a processing aid in polylactic acid as a degradable foaming material, and used as a nucleating agent in expansion-extrusion molding. However, these are not for improving the anti-blocking property of films.

Further, in the production of a resin composition for a masterbatch, the addition of a dispersing agent is generally conducted to improve dispersibility of a filler. Regarding a lactic acid-based polymer, various additives are used for modification, for example, softening, of aresin. For example, Japanese Patent Laid-Open No. 34,913/1996 discloses the addition of hydroxy-polyvalent carboxylic acid esters such as tributyl acetylcitrate and the like and polyhydric alcohol esters such as glycerol triacetate and the like. However, these additives are for imparting flexibility to a resin and not for improving dispersibility of a filler.

DISCLOSURE OF THE INVENTION

In case of molding a polymer, a so-called full compound method in which a total amount of various additives is added to a polymer, they are blended and pelletized, and the resulting pellets are fed to a molding machine for molding, or a so-called masterbatch method in which predetermined amounts of various additives are added in advance to a polymer so as to produce a masterbatch, the resulting masterbatch is diluted with a pelletized polymer, and this is fed to a molding machine for molding.

The former method is advantageous in that uniform dispersibility of various additives is good, but the total amount of the polymer is pelletized, which is not economical. Further, the latter method is advantageous in that only the polymer in an amount corresponding to the masterbatch can be pelletized. However, the dispersibility of various additives tends to be decreased.

In view of these problems, the invention aims to provide an aliphatic polyester composition for a masterbatch which is improved in dispersibility of a filler, anti-blocking property, transparency, molding stability and slipperiness and which is suited for production of an aliphatic polyester film, and a method for producing an aliphatic polyester film improved in anti-blocking property, transparency, molding stability and slipperiness using said composition.

In order to attain the aim, the present inventors have assiduously conducted investigations, and have consequently found that a resin composition obtained by adding an anti-blocking agent and, as required, a dispersing agent to an aliphatic polyester provides an aliphatic polyester film excellent in anti-blocking property, transparency, molding stability and slipperiness. This finding has led to the completion of the invention.

That is, the invention is an aliphatic polyester composition for a masterbatch comprising 100 parts by weight of an aliphatic polyester, and 0.1 to 40 parts by weight of an anti-blocking agent.

In the invention, it is preferable that the aliphatic polyester is a lactic acid-based polymer. Further, it is preferable that the anti-blocking agent is inorganic particles of at least one selected from titanium dioxide, magnesium carbonate, barium sulfate, magnesium silicate, silica, talc and kaolin. More preferable is silica. It is preferable that these anti-blocking agents have an average particle diameter of 0.007 to 0.05 µm.

As a preferable embodiment of the aliphatic polyester composition for the masterbatch in the invention, the composition containing 0.1 to 10 parts by weight, per 100 parts by weight of an aliphatic polyester, of a dispersing agent as a third component. As a preferable example of the dispersing agent, at least one compound selected from an polyhydric alcohol ester, a polybasic carboxylic acid ester and a hydroxy-polyvalent carboxylic acid ester is mentioned.

The aliphatic polyester composition for the masterbatch in the invention is preferably a composition obtained by conducting kneading, melt-extrusion and pelletization at 150 to 230° C. and then heat treatment at 40 to 100° C. for 2 to 10 hours. The production under such conditions can control crystallinity in the range of 10 to 60%.

Another aspect of the invention is a method for producing an aliphatic polyester film, which comprises adding 19 to 49 parts by weight of an aliphatic polyester to 1 part by weight of the aliphatic polyester composition for the masterbatch to form a molding material, and forming this molding material into a film at 150 to 230° C.

The composition of the invention is an aliphatic polyester composition for a masterbatch which is improved in dispersibility of a filler, anti-blocking property, transparency, molding stability and slipperiness and which is suited for production of an aliphatic polyester film. Further, according to the method of the invention, an aliphatic polyester film improved in anti-blocking agent, transparency, molding stability and slipperiness is obtained.

Consequently, the invention is preferably used in the field of containers, bottles, sheets, films, laminates, packaging materials and the like of toiletries, dairy necessaries, miscellaneous goods and the like. These have a biodegradability by which they are, when embedded in soil or discarded in sea or river as disposables, degraded into non-toxic water and carbon dioxide gas under a natural environment within a relatively short period of time like natural products such as paper, wood and the like.

BEST MODE FOR CARRYING OUT THE INVENTION

The invention is described in detail below. The aliphatic polyester composition for the masterbatch in the invention is produced by blending the aliphatic polyester with the anti-blocking agent using a ribbon blender or the like. Preferably, a method in which both are blended and the resin composition is then melt-extruded with a twin-screw extruder or the like and pelletized is mentioned.

The aliphatic polyester used in the invention is an aliphatic polyester containing a lactic acid unit in a molecule. Specific examples thereof include (1) polylactic acid and a copolymer of lactic acid and another hydroxycarboxylic acid, (2) an aliphatic polyester containing polyfunctional polysaccharides and a lactic acid unit, (3) an aliphatic polyester containing an aliphatic polybasic carboxylic acid unit, an aliphatic polyhydric alcohol unit and a lactic acid unit, and (4) a mixture thereof. These are generally termed lactic acid-based polymers.

Lactic acid includes an L-lactic acid and a D-lactic acid. When lactic acid is simply referred to in the invention, it indicates both an L-lactic acid and a D-lactic acid unless otherwise instructed. Further, the molecular weight of the polymer indicates a weight average molecular weight unless otherwise instructed. Examples of the polylactic acid used in the invention include poly(L-lactic acid) in which the structural unit is made only of L-lactic acid, poly(D-lactic acid) in which the structural unit is made only of D-lactic acid and poly(DL-lactic acid) in which the L-lactic acid unit and the D-lactic acid unit are present at various ratios, and the like. Examples of a hydroxycarboxylic acid of a lactic acid-hydroxycarboxylic acid copolymer include glycolic acid, 3-hydroxybutyric acid, 4-hydroxybutyric acid, 4-hydroxyvaleric acid, 5-hydroxyvaleric acid, 6-hydroxycaproic acid and the like.

Examples of the method for producing polylactic acid used in the invention include a method in which L-lactic acid, D-lactic acid or DL-lactic acid is subjected to direct dehydro-condensation, a method in which a lactide that is a cyclic dimer of each of these lactic acids is subjected to ring opening polymerization, and the like. The ring opening polymerization may be conducted in the presence of a hydroxyl group-containing compound such as a higher alcohol, a hydroxycarboxylic acid or the like. The polylactic acid in the invention may be produced by any of these methods. Examples of the method for producing a lactic acid-another hydroxycarboxylic acid copolymer include a method in which each of the lactic acids and the hydroxycarboxylic acid are subjected to dehydro-condensation, a method in which a cyclic material of the lactide, a cyclic dimer of each of the lactic acids and the hydroxycarboxylic acid is subjected to ring opening polymerization, and the like. The polylactic acid-another hydroxycarboxylic acid copolymer in the invention may be produced by any of these methods. The amount of the lactic acid unit contained in the copolymer is preferably at least 40 mol %.

Examples of the polyfunctional polysaccharides used headroduce the aliphatic polyester containing the polyfunctional polysaccharides and the lactic acid unit include cellulose, cellulose nitrate, methyl cellulose, ethyl cellulose, celluloid, biscose rayon, regenerated cellulose, cellophane, cupra, cuprammonium rayon, cuprophane, bemberg, hemicellulole, starch, acropectin, dextrin, dextran, glycogen, pectin, chitin, chitosan, gum arabic, guar gum, locust bean gum, acacia gum and the like, mixtures thereof, and derivatives thereof. Of these, cellulose acetate and ethyl cellulose are especially preferable.

The method for producing the aliphatic polyester containing the polyfunctional polysaccharides and the lactic acid unit include a method in which the polyfunctional polysaccharides are reacted with the polylactic acid, the lactic acid-another hydroxycarboxylic acid copolymer and the like, a method in which the polyfunctional polysaccharides are reacted with the lactic acids, the cyclic esters and the like, and so forth. The aliphatic polyester containing the polyfunctional polysaccharides and the lactic acid unit in the invention may be produced by any of these methods. The amount of the lactic acid unit contained in the aliphatic polyester is preferably at least 50 mol %.

Examples of the aliphatic polyvalent carboxylic acid used in the production of the aliphatic polyester containing the aliphatic polyvalent carboxylic acid unit, the aliphatic polyhydric alcohol unit and the lactic acid unit include oxalic acid, citric acid, malonic acid, glutaric acid, adipic acid, pimelic acid, suberic acid, azelaic acid, undecadioic acid, dodecadionic acid and the like, and anhydrides thereof. These may be mixtures with acid anhydrides. Further, examples of the aliphatic polyhydric alcohols include ethylene glycol, diethylene glycol, triethylene glycol, propylene glycol, dipropylene glycol, 1,3-butanediol, 1,4-butanediol, 3-methyl-1,5-pentanediol, 1,6-hexanediol, 1,9- nonanediol, neopentyl glycol, tetramethylene glycol, 1,4-cyclohexanedimethanol and the like.

Examples of the method for producing the aliphatic polyester containing the aliphatic polyvalent carboxylic acid unit, the aliphatic polyhydric alcohol unit and the lactic acid unit include a method in which the aliphatic polyvalent carboxylic acid and the aliphatic polyhydric alcohol are reacted with the polylactic acid, the lactic acid-another hydroxycarboxylic acid copolymer and the like, a method in which the aliphatic polyvalent carboxylic acid and the aliphatic polyhydric alcohol are reacted with the lactic acids, the cyclic esters and the like, and so forth. The aliphatic polyester containing the aliphatic polyvalent carboxylic acid unit, the aliphatic polyhydric alcohol unit and the lactic acid unit may be produced by any of these methods. The amount of the lactic acid unit contained in the aliphatic polyester is preferably at least 50 mol %.

The molecular weight of the lactic acid-based polymer influences the moldability of the film and the strengths and the degradability of the resulting film. When the molecular weight is low, the strengths of the resulting film are decreased, and it is broken, in some cases, by tension in use. Further, the rate of degradation becomes high. On the contrary, when the molecular weight is high, the moldability is decreased, and the film formation becomes difficult. In consideration of these points, the molecular weight of the lactic acid-based polymer used in the invention is preferably in the range of approximately 10,000 to approximately 1,000,000. It is further preferably in the range of 100,000 to 300,000.

Examples of the anti-blocking agent used in the invention include inorganic particles of titanium dioxide, magnesium carbonate, barium sulfate, magnesium silicate, silica, talc, kaolin and the like. Of these, silica ($SiO_2$) is preferable. Considering the moldability, the properties, the handleability in molding and the like of the film, it is preferable that the average particle diameter of the anti-blocking agent is between 0.007 and 0.05 $\mu$m. The form is preferably a particulate form. When the particle diameter is less than 0.007 $\mu$m, the particles tend to be agglomerated, and the workability is decreased. When it exceeds 0.05 $\mu$m and is especially several micrometers, fine raised and depressed portions are formed on a surface of a molded product or a film, and an appearance becomes non-transparent.

The amount of the anti-blocking agent used is 0.1 to 40 parts by weight per 100 parts by weight of the aliphatic polyester. It is preferably 1 to 40 parts by weight, more preferably at least 6.3 parts by weight and less than 40 parts by weight. When the amount added is less than 0.1 part by weight, the effect of the anti-blocking property is not exhibited in diluting the masterbatch at a high rate. When the amount added exceeds 40 parts by weight, the appearance, especially, the transparency, of the molded product is decreased.

The aliphatic polyester composition for the masterbatch in the invention may contain a dispersing agent. Examples of the dispersing agent include polyhydric alcohol esters such as glycerol tripropionate, glycerol triacetate, glycerol monostearate, glycerol diacetomonolaurate, decaglycerol oleate and the like, polyvalent carboxylic acid esters such as dioctyl phthalate, dibutyl phthalate, dioctyl adipate, dibutyl sebacate and the like, and hydroxy-polyvalent carboxylic acid esters such as tributyl acetylcitrate and the like. Of these, glycerol triacetate, glycerol diacetomonolaurate, decaglycerol oleate and tributyl acetylcitrate are preferable.

When the amount of the dispersing agent added is too large, the crystallinity and the heat resistance of the molded product are decreased. From this standpoint, the amount of the dispersing agent added is preferably 10 parts by weight or less based on 100 parts by weight of the aliphatic polyester. It is more preferably 5 parts by weight or less. In case of adding the dispersing agent, the lower limit is usually approximately 0.1 part by weight per 100 parts by weight of the aliphatic polyester.

Known blending techniques can all be applied to the blending of the aliphatic polyester with the anti-blocking agent and as required, the dispersing agent. For example, a ribbon blender method, an extrusion melt-blending method, a Banbury blending method and the like are mentioned. Considering that the dispersibility of the anti-blocking agent in producing the aliphatic polyester composition for the masterbatch is improved and the anti-blocking property of a molded product such as a film or the like is satisfactorily exhibited, it is preferable that the addition is conducted in the polymerization of the aliphatic polyester. Further, with respect to the form of the aliphatic polyester, a cylindrical pellet having a diameter of 1 to 5 mm and a length of 1 to 5 mm, a flat-disk-like pellet having a diameter of 1 to 5 mm or a powdery polymer having an average particle diameter of 10 to 5,000 $\mu$m is preferable. In the powdery polymer, the average particle diameter is further preferably 10 to 500 $\mu$m.

In consideration of the flexibility, the slipperiness, the handling, the heat stability in molding and in use, the stability with time of the dynamic and optical properties and the like, the aliphatic polyester composition for the masterbatch in the invention can contain, as required, modifiers such as a plasticizer, a lubricant, an antistatic agent, a nucleating agent, an antioxidant, an ultraviolet absorber and the like.

Usually, the aliphatic polyester composition for the masterbatch in the invention is used for molding by being formed into pellets, rods or the like. A preferable method for producing the aliphatic polyester composition for the masterbatch in the invention is described. The aliphatic polyester and the anti-blocking agent and, as required, the dispersing agent and other modifiers are blended with a ribbon blender, and then kneaded, melt-extruded and pelletized at a cylinder set temperature of 150 to 230° C. using an extruder. Preferably, after the pelletization, the product is heat-treated at 40 to 100° C. for approximately 2 to 10 hours. The heat treatment can accelerate crystallization of the polymer in the pellets to improve the heat resistance. Consequently, the adhesion of the pellets is prevented to improve the dropping property from a hopper in the extrusion step. Further, the change in the pressure within the extruder is reduced to improve the molding stability. The pelletization under these conditions can make the crystallinity of the aliphatic polyester 10 to 60%.

The method for producing the aliphatic polyester film using the aliphatic polyester composition for the masterbatch according to the invention is described below. The aliphatic polyester composition of the invention is used by being diluted to approximately 20 to 50 times with the lactic acid-based polymer. Specifically, 19 to 49 parts by weight of the aliphatic polyester is added to 1 part by weight of the aliphatic polyester composition for the masterbatch. The known blending techniques can all be applied to the blending of the aliphatic polyester composition for the masterbatch and the aliphatic polyester as well. Further, in consideration of the flexibility, the slipperiness, the handling, the heat stability in molding and in use, the stability with time of the dynamic and optical properties and the like, additives such as a plasticizer, a lubricant, an antistatic agent, a nucleating agent, an antioxidant, an ultraviolet absorber and the like can be added, as required, in the blending.

The film is produced by uniformly blending the aliphatic polyester composition for the masterbatch of the invention, the aliphatic polyester and, as required, the other additives such as a plasticizer, an antioxidant, a lubricant and the like with a blender, pelletizing the mixture, forming a film through extrusion molding with an extruder fitted with a T die, tubular molding with an extruder fitted with a circular die, through sheet-forming or the like, and, as required, further stretching the same. The film formation can be conducted by setting the cylinder temperature of the extruder in the extrusion molding at 150 to 230° C. and installing a desired mold at the head of the extruder.

The film obtained by the extrusion molding is stretched as required. In connection with the stretching direction, both uniaxial stretching and biaxial stretching are available. It is advisable that the stretching temperature is 30 to 100° C. and the stretch ratio is 1.5 to 5 times. It is advisable that after the stretching, the heat treatment is conducted at 80 to 150° C. for 3 to 120 seconds for crystallization. The thickness of the resulting film is approximately 5 to 1,000 $\mu$m. When an unstretched film without stretching is employed as a product, the above-mentioned thickness is available. The thus-obtained film is excellent in the transparency, the anti-blocking property and the slipperiness as well as in the heat resistance.

EXAMPLES

The invention is described more specifically by referring to the following Examples. The invention is not limited to these Examples.

Production of a Lactic Acid-based Polymer

By the way, a weight average molecular weight (Mw) of a polymer was measured by gel permeation chromatography under the following conditions using polystyrene as a standard.

Apparatus: model; LC-10AD, made by Shimadzu Corporation, detector: Shimadzu RID-6A, column: Hitachi Kasei GL-S350DT-5, GL-S370DT-5, solvent: chloroform, concentration: 1% by weight, injection amount: 20 $\mu$l, flow rate: 1.0 ml/min.

Production Example 1

One hundred parts by weight of L-lactide, 0.01 part by weight of titanous octoate and 0.03 part by weight of lauryl alcohol were charged into a cylindrical stainless steel polymerization thick vessel equipped with a stirrer. The vessel was deaerated in vacuo for 2 hours, and then purged with a nitrogen gas. This mixture was heated at 200° C. for 3 hours in a nitrogen atmosphere while being stirred. While this temperature was maintained, deaeration was gradually conducted with a vacuum pump through an exhaust tube and a glass receptacle, and the pressure inside the reaction vessel was reduced to 3 mmHg. One hour later from the start-up of the deaeration, the monomer and the low-molecular volatile matters were no longer distilled off. Accordingly, the inside of the vessel was purged with nitrogen. The polymer was withdrawn from the bottom of the vessel in the form of a string, and pelletized to obtain lactic acid-based polymer A having an average diameter of 3 mm and a length of 3 mm. The weight average molecular weight (Mw) of this polymer was approximately 100,000.

Production Example 2

While 10 kg of 90-weight-% L-lactic acid was stirred at 150° C. and 50 mmHg for 3 hours in a 100-liter reaction vessel equipped with a Dean-Stark trap, water was distilled off, and 6.2 g of tin powder was added. The mixture was further stirred at 150° C. and 30 mmHg for 2 hours for oligomerization. To this oligomer were added 28.8 g of tin powder and 21.1 kg of diphenyl ether, and an azeotropic dehydration reaction was conducted at 150° C. and 35 mmHg, and water and the solvent distilled off were separated with a water separator, and only the solvent was returned to the reaction vessel. Two hours later, the organic solvent to be returned to the reaction vessel was passed through a column filled with 4.6 kg of a molecular sieve 3A, and then returned to the reaction vessel. The reaction was conducted at 150° C. and 35 mmHg for 40 hours to obtain a lactic acid-based polymer solution having an average molecular weight of 110,000. This solution was diluted by adding 44 kg of dehydrated diphenyl ether, and then cooled to 40° C. The crystals precipitated were filtered, washed three times with 10 kg of n-hexane, and dried at 60° C. and 50 mmHg. To this powder were added 12 kg of 0.5 N-hydrochloric acid and 12 kg of ethanol. The mixture was stirred at 35° C. for 1 hour, then filtered, and dried at 60° C. and 50 mmHg to obtain 6.1 kg (yield 85% by weight) of powdery lactic acid-based polymer B. The weight average molecular weight Mw of this polymer was 110,000. The powdery polymer was sieved such that the average particle diameters thereof were 10, 50, 100, 200 and 500 $\mu$m.

With respect to the aliphatic polyester composition for the masterbatch according to the invention and stretched films having a thickness of approximately 15 $\mu$m which were produced from polymers A and B obtained in Production Examples by methods shown in Examples, the following evaluation was conducted.

(1) Crystallinity (%)

An amount ($\Delta H$) of heat of melting was measured from a peak area of a melting curve using a differential scanning calorimeter [made by Rigaku K.K., model: TAS100], and crystallinity [$X_c$: unit (%)] was calculated from the amount ($\Delta H_0$) of heat of melting of a complete crystal using the following equation (1). By the way, indium was used as a standard substance.

$$X_c = (\Delta H / \Delta H_0) \times 100 \qquad \text{(equation 1)}$$

(2) Molding Stability (Rate of Change in Pressure)

A pressure in an extruder when forming a film was measured, and a rate [$P_{cv}$, unit: (%)] of change in a pressure was calculated from an average pressure ($P_h$), a maximum pressure ($P_{max}$) and a minimum pressure ($P_{min}$) using the following equation (2). When the rate of change in the pressure is high, the molding is not stable, and a thickness and properties of a film are non-uniform.

$$P_{cv} = [(P_{max} - P_{min})/P_h] \times 100 \qquad \text{(equation 2)}$$

(3) Dispersibility

A film is observed using a microscope (50× magnification), and the number of filler agglomerates having a diameter of 10 $\mu$m or more is counted, and the evaluation is conducted as follows.

⊚: No agglomerate is observed.

○: The number of agglomerates is 1 to 3/cm².

×: The number of agglomerates is 4 or more/cm².

(4) Anti-blocking Property

Measured according to the method regulated in JIS-Z 0219.

(5) Transparency [Haze: Unit; (%)]

The measurement was conducted using Haze Meter manufactured by Tokyo Denshoku K.K. to obtain a haze value (%).

Reference Example

One hundred parts by weight of lactic acid-based polymer B (not sieved) obtained in Production Example 2 and 0.2 part by weight of an anti-blocking agent (SiO$_2$ content 99% or more, trade name Aerosyl 200: made by Nippon Aerosyl K.K.) were blended with a ribbon blender, and then pelletized with an extruder at a cylinder set temperature of 170 to 210° C. The pellets were heat-treated in an oven of 50° C. for 2 hours for crystallization, and then melted with an extruder at a cylinder set temperature of 160 to 200° C. An unstretched film having a thickness of 0.1 mm was obtained from a T die on the head of the extruder. The rate of change in the pressure in the molding was 3%. The resulting unstretched film was stretched to 2 times longitudinally and then to 3 times transversely, and heat-treated at 130° C. Subsequently, the film was cooled using air of 30° C. to obtain a stretched film having a thickness of approximately 15 μm. The results of the evaluation of the resulting stretched film are shown in [Table 1].

Example 1

One hundred parts by weight of lactic acid-based polymer A obtained in Production Example 1 and 0.1 part by weight of an anti-blocking agent (SiO$_2$ content 99% by weight or more, trade name: Aerosyl 300: made by Nippon Aerosyl K.K.) having an average particle diameter of 0.007 μm were blended with a ribbon blender, and then melt-extruded and pelletized with an extruder at a cylinder set temperature of 170 to 210° C. to obtain a lactic acid-based polymer composition for a masterbatch. The pellets were heat-treated with an oven of 40° C. for 5 hours to obtain pellets having crystallinity of 10%. Subsequently, lactic acid-based polymer A and the resulting masterbatch pellets were blended with a Henschel mixer at a ratio of 19:1, and melted with an extruder at a cylinder set temperature of 160 to 200° C. to obtain an unstretched film having a thickness of 0.1 mm from a T die on the head of the extruder. The rate of change in the pressure in the molding was 8%. The resulting unstretched film was stretched to 2 times longitudinally and then to 3 times transversely, and heat-treated at 130° C. for 60 seconds. Then, the film was cooled with air of 30° C. to obtain a stretched film having a thickness of approximately 15 μm. The results of evaluation of the resulting stretched film are shown in [Table 1].

Example 2

One hundred parts by weight of lactic acid-based polymer A obtained in Production Example 1 and 6.3 parts by weight of an anti-blocking agent (SiO$_2$ content 99% by weight or more, trade name: Aerosyl 300: made by Nippon Aerosyl K.K.) having an average particle diameter of 0.007 μm were blended with a ribbon blender, and then melt-extruded and pelletized with an extruder at a cylinder set temperature of 170 to 210° C. to obtain a lactic acid-based polymer composition for a masterbatch. The pellets were heat-treated with an oven of 50° C. for 4 hours to obtain pellets having crystallinity of 20%. Subsequently, lactic acid-based polymer A and the resulting masterbatch pellets were blended with a Henschel mixer at a ratio of 19:1, and melted with an extruder at a cylinder set temperature of 160 to 200° C. to obtain an unstretched film having a thickness of 0.1 mm from a T die on the head of the extruder. The rate of change in the pressure in the molding was 5%. The resulting unstretched film was stretched to 2 times longitudinally and then to 3 times transversely, and heat-treated at 130° C. for 60 seconds. Then, the film was cooled with air of 30° C. to obtain a stretched film having a thickness of approximately 15 μm. The results of evaluation of the resulting stretched film are shown in [Table 1].

Example 3

One hundred parts by weight of lactic acid-based polymer A obtained in Production Example 1 and 20 parts by weight of an anti-blocking agent (SiO$_2$ content 99% by weight or more, trade name: Aerosyl 130: made by Nippon Aerosyl K.K.) having an average particle diameter of 0.016 μm were blended with a ribbon blender, and then melt-extruded and pelletized with an extruder at a cylinder set temperature of 170 to 210° C. to obtain a lactic acid-based polymer composition for a masterbatch. The pellets were heat-treated with an oven of 50° C. for 6 hours to obtain pellets having crystallinity of 38%. Subsequently, lactic acid-based polymer A and the resulting masterbatch pellets were blended with a Henschel mixer at a ratio of 39:1, and melted with an extruder at a cylinder set temperature of 160 to 200° C. to obtain an unstretched film having a thickness of 0.1 mm from a T die on the head of the extruder. The rate of change in the pressure in the molding was 6%. The resulting unstretched film was stretched to 2 times longitudinally and then to 3 times transversely, and heat-treated at 130° C. for 60 seconds. Then, the film was cooled with air of 30° C. to obtain a stretched film having a thickness of approximately 15 μm. The results of evaluation of the resulting stretched film are shown in [Table 1].

TABLE 1

| | Reference Example | Example 1 | Example 2 | Example 3 |
|---|---|---|---|---|
| Type of anti-blocking agent | silica | same as left | same as left | same as left |
| Average particle diameter of anti-blocking agent (μm) | 0.012 | 0.007 | 0.007 | 0.016 |
| Amount of anti-blocking agent (parts by weight) | 0.2 | 0.1 | 6.3 | 20 |
| Type of dispersing agent | no | no | no | no |
| Amount of dispersing agent (parts by weight) | no | no | no | no |
| Type of resin | B | A | same as left | same as left |
| Amount of resin (parts by weight) | 100 | same as left | same as left | same as left |
| Particle diameter of resin (μm) | pellet (3 mm × 3 mm) | same as left | same as left | same as left |

TABLE 1-continued

|  | Reference Example | Example 1 | Example 2 | Example 3 |
|---|---|---|---|---|
| Conditions of heat treatment | — | 40° C. × 5 hrs | 50° C. × 4 hrs | 50° C. × 6 hrs |
| Crystallinity (%) | — | 10 | 20 | 38 |
| Blending ratio (resin:MB) | — | 19:1 | 19:1 | 39:1 |
| Molding stability Rate of change in pressure (%) | 3 | 8 | 5 | 6 |
| Dispersibility | ◯ | ◯ | ◯ | ◯ |
| Anti-blocking property | ◯ | ◯ | ◯ | ◯ |
| Haze (%) | 0.8 | 0.5 | 0.8 | 0.9 |

Example 4

One hundred parts by weight of lactic acid-based polymer A obtained in Production Example 1 and 40 parts by weight of an anti-blocking agent having an average particle diameter of 0.05 μm were blended with a ribbon blender, and then melt-extruded and pelletized with an extruder at a cylinder set temperature of 170 to 210° C. to obtain a lactic acid-based polymer composition for a masterbatch. The pellets were heat-treated with an oven of 60° C. for 6 hours to obtain pellets having crystallinity of 42%. Subsequently, lactic acid-based polymer A and the resulting masterbatch pellets were blended with a Henschel mixer at a ratio of 49:1, and melted with an extruder at a cylinder set temperature of 160 to 200° C. to obtain an unstretched film having a thickness of 0.1 mm from a T die on the head of the extruder. The rate of change in the pressure in the molding was 4%. The resulting unstretched film was stretched to 2 times longitudinally and then to 3 times transversely, and heat-treated at 130° C. for 60 seconds. Then, the film was cooled with air of 30° C. to obtain a stretched film having a thickness of approximately 15 μm. The results of evaluation of the resulting stretched film are shown in [Table 2].

Example 5

One hundred parts by weight of lactic acid-based polymer A obtained in Production Example 1, 10 parts by weight of an anti-blocking agent (SiO$_2$ content 99% by weight or more, trade name: Aerosyl 130: made by Nippon Aerosyl K.K.) having an average particle diameter of 0.016 μm and 10 parts by weight of glycerol triacetate were blended with a ribbon blender, and then melt-extruded and pelletized with an extruder at a cylinder set temperature of 170 to 210° C. to obtain a lactic acid-based polymer composition for a masterbatch. The pellets were heat-treated with an oven of 60° C. for 5 hours to obtain pellets having crystallinity of 35%. Subsequently, lactic acid-based polymer A and the resulting masterbatch pellets were blended with a Henschel mixer at a ratio of 19:1, and melted with an extruder at a cylinder set temperature of 160 to 200° C. to obtain an unstretched film having a thickness of 0.1 mm from a T die on the head of the extruder. The rate of change in the pressure in the molding was 3%. The resulting unstretched film was stretched to 2 times longitudinally and then to 3 times transversely, and heat-treated at 130° C. for 60 seconds. Then, the film was cooled with air of 30° C. to obtain a stretched film having a thickness of approximately 15 μm. The results of evaluation of the resulting stretched film are shown in [Table 2].

Example 6

One hundred parts by weight of lactic acid-based polymer A obtained in Production Example 1, 20 parts by weight of an anti-blocking agent (SiO$_2$ content 99% by weight or more, trade name: Aerosyl OX50: made by Nippon Aerosyl K.K.) having an average particle diameter of 0.03 μm and 5 parts by weight of tributyl acetylcitrate were blended with a ribbon blender, and then melt-extruded and pelletized with an extruder at a cylinder set temperature of 170 to 210° C. to obtain a lactic acid-based polymer composition for a masterbatch. The pellets were heat-treated with an oven of 80° C. for 5 hours to obtain pellets having crystallinity of 55%. Subsequently, lactic acid-based polymer A and the resulting masterbatch pellets were blended with a Henschel mixer at a ratio. of 39:1, and melted with an extruder at a cylinder set temperature of 160 to 200° C. to obtain an unstretched film having a thickness of 0.1 mm from a T die on the head of the extruder. The rate of change in the pressure in the molding was 6%. The resulting unstretched film was stretched to 2 times longitudinally and then to 3 times transversely, and heat-treated at 130° C. for 60 seconds. Then, the film was cooled with air of 30° C. to obtain a stretched film having a thickness of approximately 15 μm. The results of evaluation of the resulting stretched film are shown in [Table 2].

Example 7

One hundred parts by weight of lactic acid-based polymer A obtained in Production Example 1, 10 parts by weight of an anti-blocking agent (SiO$_2$ content 99% by weight or more, trade name: Aerosyl 130: made by Nippon Aerosyl K.K.) having an average particle diameter of 0.016 μm and 8 parts by weight of glycerol diacetomonolaurate were blended with a ribbon blender, and then melt-extruded and pelletized with an extruder at a cylinder set temperature of 170 to 210° C. to obtain a lactic acid-based polymer composition for a masterbatch. The pellets were heat-treated with an oven of 60° C. for 6 hours to obtain pellets having crystallinity of 38%. Subsequently, lactic acid-based polymer A and the resulting masterbatch pellets were blended with a Henschel mixer at a ratio of 19:1, and melted with an extruder at a cylinder set temperature of 160 to 200° C. to obtain an unstretched film having a thickness of 0.1 mm from a T die on the head of the extruder. The rate of change in the pressure in the molding was 5%. The resulting unstretched film was stretched to 2 times longitudinally and then to 3 times transversely, and heat-treated at 130° C. for 60 seconds. Then, the film was cooled with air of 30° C. to obtain a stretched film having a thickness of approximately 15 μm. The results of evaluation of the resulting stretched film are shown in [Table 2].

TABLE 2

|  | Example 4 | Example 5 | Example 6 | Example 7 |
| --- | --- | --- | --- | --- |
| Type of anti-blocking agent | silica | same as left | same as left | same as left |
| Average particle diameter of anti-blocking agent ($\mu$m) | 0.050 | 0.016 | 0.030 | 0.016 |
| Amount of anti-blocking agent (parts by weight) | 40 | 10 | 20 | 10 |
| Type of dispersing agent | no | A1 | A2 | A3 |
| Amount of dispersing agent (parts by weight) | no | 10 | 5 | 8 |
| Type of resin | A | same as left | same as left | same as left |
| Amount of resin (parts by weight) | 100 | same as left | same as left | same as left |
| Particle diameter of resin ($\mu$m) | pellet (3 mm × 3 mm) | same as left | same as left | same as left |
| Conditions of heat treatment | 60° C. × 6 hrs | 60° C. × 5 hrs | 80° C. × 5 hrs | 60° C. × 6 hrs |
| Crystallinity (%) | 42 | 35 | 55 | 38 |
| Blending ratio (resin:MB) | 49:1 | 19:1 | 39:1 | 19:1 |
| Molding stability Rate of change in pressure (%) | 4 | 3 | 6 | 5 |
| Dispersibility | ○ | ○ | ◎ | ◎ |
| Anti-blocking property | ◎ | ○ | ○ | ○ |
| Haze (%) | 1.1 | 0.5 | 0.6 | 0.4 |

A1: glycerol triacetate
A2: tributyl acetylcitrate
A3: glycerol diacetomonolaurate Example 8

One hundred parts by weight of lactic acid-based polymer obtained in Production Example 1, 30 parts by weight of an anti-blocking agent (SiO$_2$ content 99% by weight or more, trade name: Aerosyl OX50: made by Nippon Aerosyl K.K.) having an average particle diameter of 0.03 $\mu$m and 10 parts by weight of decaglycerol oleate were blended with a ribbon blender, and then melt-extruded and pelletized with an extruder at a cylinder set temperature of 170 to 210° C. to obtain a lactic acid-based polymer composition for a masterbatch. The pellets were heat-treated with an oven of 50° C. for 6 hours to obtain pellets having crystallinity of 30%. Subsequently, lactic acid-based polymer A and the resulting masterbatch pellets were blended with a Henschel mixer at a ratio of 39:1, and melted with an extruder at a cylinder set temperature of 160 to 200° C. to obtain an unstretched film having a thickness of 0.1 mm from a T die on the head of the extruder. The rate of change in the pressure in the molding was 5%. The resulting unstretched film was stretched to 2 times longitudinally and then to 3 times transversely, and heat-treated at 130° C. for 60 seconds. Then, the film was cooled with air of 30° C. to obtain a stretched film having a thickness of approximately 15 $\mu$m. The results of evaluation of the resulting stretched film are shown in [Table 3].

Example 9

One hundred parts by weight of lactic acid-based polymer B having an average particle diameter of 10 $\mu$m, which was obtained in Production Example 2, 40 parts by weight of an anti-blocking agent (SiO$_2$ content 99% by weight or more, trade name: Aerosyl 200: made by Nippon Aerosyl K.K.) having an average particle diameter of 0.012 $\mu$m and 10 parts by weight of glycerol diacetomonolaurate were blended with a ribbon blender, and then melt-extruded and pelletized with an extruder at a cylinder set temperature of 170 to 210° C. to obtain a lactic acid-based polymer composition for a masterbatch. The pellets were heat-treated with an oven of 50° C. for 8 hours to obtain pellets having crystallinity of 37%. Subsequently, lactic acid-based polymer A and the resulting masterbatch pellets were blended with a Henschel mixer at a ratio of 49:1, and melted with an extruder at a cylinder set temperature of 160 to 200° C. to obtain an unstretched film having a thickness of 0.1 mm from a T die on the head of the extruder. The rate of change in the pressure in the molding was 7%. The resulting unstretched film was stretched to 2 times longitudinally and then to 3 times transversely, and heat-treated at 130° C. for 60 seconds. Then, the film was cooled with air of 30° C. to obtain a stretched film having a thickness of approximately 15 $\mu$m. The results of evaluation of the resulting stretched film are shown in [Table 3].

Example 10

One hundred parts by weight of lactic acid-based polymer having an average particle diameter of 50 $\mu$m, which was obtained in Production Example 2, 20 parts by weight of an anti-blocking agent (SiO$_2$ content 99% by weight or more, trade name: Aerosyl 130: made by Nippon Aerosyl K.K.) having an average particle diameter of 0.016 $\mu$m and 5 parts by weight of glycerol diacetomonolaurate were blended with a ribbon blender, and then melt-extruded and pelletized with an extruder at a cylinder set temperature of 170 to 210° C. to obtain a lactic acid-based polymer composition for a masterbatch. The pellets were heat-treated with an oven of 50° C. for 8 hours to obtain pellets having crystallinity of 39%. Subsequently, lactic acid-based polymer A and the resulting masterbatch pellets were blended with a Henschel mixer at a ratio of 39:1, and melted with an extruder at a cylinder set temperature of 160 to 200° C. to obtain an unstretched film having a thickness of 0.1 mm from a T die on the head of the extruder. The rate of change in the pressure in the molding was 5%. The resulting unstretched film was stretched to 2 times longitudinally and then to 3 times transversely, and heat-treated at 130° C. for 60 seconds. Then, the film was cooled with air of 30° C. to obtain a stretched film having a thickness of approximately 15 $\mu$m. The results of evaluation of the resulting stretched film are shown in [Table 3].

Example 11

One hundred parts by weight of lactic acid-based polymer B having an average particle diameter of 500 $\mu$m, which was obtained in Production Example 2, 40 parts by weight of an anti-blocking agent (SiO$_2$ content 99% by weight or more, trade name: Aerosyl 200: made by Nippon Aerosyl K.K.) having an average particle diameter of 0.012 μm and 10 parts by weight of decaglycerol oleate were blended with a ribbon blender, and then melt-extruded and pelletized with an extruder at a cylinder set temperature of 170 to 210° C. to obtain a lactic acid-based polymer composition for a masterbatch. The pellets were heat-treated with an oven of 50° C. for 10 hours to obtain pellets having crystallinity of 44%. Subsequently, lactic acid-based polymer A and the resulting masterbatch pellets were blended with a Henschel mixer at a ratio of 49:1, and melted with an extruder at a cylinder set temperature of 160 to 200° C. to obtain an unstretched film having a thickness of 0.1 mm from a T die on the head of the extruder. The rate of change in the pressure in the molding was 4%. The resulting unstretched film was stretched to 2 times longitudinally and then to 3 times transversely, and heat-treated at 130° C. for 60 seconds. Then, the film was cooled with air of 30° C. to obtain a stretched film having a thickness of approximately 15 μm. The results of evaluation of the resulting stretched film are shown in [Table 3].

heat-treated at 130° C. for 60 seconds. Then, the film was cooled with air of 30° C. to obtain a stretched film having a thickness of approximately 15 μm. The results of evaluation of the resulting stretched film are shown in [Table 4].

Comparative Example 2

One hundred parts by weight of lactic acid-based polymer A obtained in Production Example 1 and 20 parts by weight of an anti-blocking agent having an average particle diameter of 0.1 μm were blended with a ribbon blender, and then melt-extruded and pelletized with an extruder at a cylinder set temperature of 170 to 210° C. to obtain a lactic acid-based polymer composition for a masterbatch. The pellets were heat-treated with an oven of 60° C. for 5 hours to obtain pellets having crystallinity of 39%. Subsequently, lactic acid-based polymer A and the resulting masterbatch pellets were blended with a Henschel mixer at a ratio of 39:1, and melted with an extruder at a cylinder set temperature of 160 to 200° C. to obtain an unstretched film having a thickness of 0.1 mm from a T die on the head of the extruder. The rate of change in the pressure in the molding was 8%. The resulting unstretched film was stretched to 2 times longitudinally and then to 3 times transversely, and

TABLE 3

|  | Example 8 | Example 9 | Example 10 | Example 11 |
|---|---|---|---|---|
| Type of anti-blocking agent | silica | same as left | same as left | same as left |
| Average particle diameter of anti-blocking agent (μm) | 0.030 | 0.012 | 0.016 | 0.012 |
| Amount of anti-blocking agent (parts by weight) | 30 | 40 | 20 | 40 |
| Type of dispersing agent | A4 | A3 | A3 | A4 |
| Amount of dispersing agent (parts by weight) | 10 | 10 | 5 | 10 |
| Type of resin | A | B | same as left | same as left |
| Amount of resin (parts by weight) | 100 | same as left | same as left | same as left |
| Particle diameter of resin (μm) | pellet (3 mm × 3 mm) | 10 | 50 | 500 |
| Conditions of heat treatment | 50° C. × 6 hrs | 50° C. × 8 hrs | 50° C. × 8 hrs | 50° C. × 10 hrs |
| Crystallinity (%) | 30 | 37 | 39 | 44 |
| Blending ratio (resin:MB) | 39:1 | 49:1 | 39:1 | 49:1 |
| Molding stability Rate of change in pressure (%) | 5 | 7 | 5 | 4 |
| Dispersibility | ⊚ | ⊚ | ⊚ | ⊚ |
| Anti-blocking property | ○ | ○ | ⊚ | ⊚ |
| Haze (%) | 0.4 | 0.5 | 0.5 | 0.4 |

A3: glycerol diacetomonolaurate
A4: decaglycerol oleate

Comparative Example 1

One hundred parts by weight of lactic acid-based polymer A obtained in Production Example 1 and 10 parts by weight of an anti-blocking agent having an average particle diameter of 0.005 μm were blended with a ribbon blender, and then melt-extruded and pelletized with an extruder at a cylinder set temperature of 170 to 210° C. to obtain a lactic acid-based polymer composition for a masterbatch. The pellets were heat-treated with an oven of 50° C. for 5 hours to obtain pellets having crystallinity of 30%. Subsequently, lactic acid-based polymer A and the resulting masterbatch pellets were blended with a Henschel mixer at a ratio of 19:1, and melted with an extruder at a cylinder set temperature of 160 to 200° C. to obtain an unstretched film having a thickness of 0.1 mm from a T die on the head of the extruder. The rate of change in the pressure in the molding was 5%. The resulting unstretched film was stretched to 2 times longitudinally and then to 3 times transversely, and Comparative Example 3

One hundred parts by weight of lactic acid-based polymer A obtained in Production Example 1 and 0.05 part by weight of an anti-blocking agent (SiO$_2$ content 99% by weight or more, trade name: Aerosyl 200: made by Nippon Aerosyl K.K.) having an average particle diameter of 0.012 μm were blended with a ribbon blender, and then melt-extruded and pelletized with an extruder at a cylinder set temperature of 170 to 210° C. to obtain a lactic acid-based polymer composition for a masterbatch. The pellets were heat-treated with an oven of 60° C. for 8 hours to obtain pellets having crystallinity of 41%. Subsequently, lactic acid-based polymer A and the resulting masterbatch pellets were blended with a Henschel mixer at a ratio of 19:1, and melted with an extruder at a cylinder set temperature of 160 to 200° C. to obtain an unstretched film having a thickness of 0.1 mm from a T die on the head of the extruder. The rate of change in the pressure in the molding was 9%. The resulting unstretched film was stretched to 2 times longitudinally and then to 3 times transversely, and heat-treated at 130° C. for 60 seconds. Then, the film was cooled with air of 30° C. to obtain a stretched film having a thickness of approximately 15 μm. The results of evaluation of the resulting stretched film are shown in [Table 4].

Comparative Example 4

One hundred parts by weight of lactic acid-based polymer A obtained in Production Example 1 and 55 parts by weight of an anti-blocking agent (SiO$_2$ content 99% by weight or more, trade name: Aerosyl 200: made by Nippon Aerosyl K.K.) having an average particle diameter of 0.012 μm were blended with a ribbon blender, and then melt-extruded and pelletized with an extruder at a cylinder set temperature of 170 to 210° C. to obtain a lactic acid-based polymer composition for a masterbatch. The pellets were heat-treated with an oven of 60° C. for 10 hours to obtain pellets having crystallinity of 47%. Subsequently, lactic acid-based polymer A and the resulting masterbatch pellets were blended with a Henschel mixer at a ratio of 19:1, and melted with an extruder at a cylinder set temperature of 160 to 200° C. to obtain an unstretched film having a thickness of 0.1 mm from a T die on the head of the extruder. The rate of change in the pressure in the molding was 6%. The resulting unstretched film was stretched to 2 times longitudinally and then to 3 times transversely, and heat-treated at 130° C. for 60 seconds. Then, the film was cooled with air of 30° C. to obtain a stretched film having a thickness of approximately 15 μm. The results of evaluation of the resulting stretched film are shown in [Table 4].

K.K.) having an average particle diameter of 0.012 μm and 10 parts by weight of glycerol triacetate were blended with a ribbon blender, and then melt-extruded and pelletized with an extruder at a cylinder set temperature of 170 to 210° C. to obtain a lactic acid-based polymer composition for a masterbatch. The pellets were heat-treated with an oven of 50° C. for 8 hours to obtain pellets having crystallinity of 37%. Subsequently, lactic acid-based polymer A and the resulting masterbatch pellets were blended with a Henschel mixer at a ratio of 19:1, and melted with an extruder at a cylinder set temperature of 160 to 200° C. to obtain an unstretched film having a thickness of 0.1 mm from a T die on the head of the extruder. The rate of change in the pressure in the molding was 3%. The resulting unstretched film was stretched to 2 times longitudinally and then to 3 times transversely, and heat-treated at 130° C. for 60 seconds. Then, the film was cooled with air of 30° C. to obtain a stretched film having a thickness of approximately 15 μm. The results of evaluation of the resulting stretched film are shown in [Table 5].

Comparative Example 6

One hundred parts by weight of lactic acid-based polymer A obtained in Production Example 1, 6 parts by weight of an anti-blocking agent (SiO$_2$ content 99% by weight or more, trade name: Aerosyl 300: made by Nippon Aerosyl K.K.) having an average particle diameter of 0.007 μm and 50 parts by weight of glycerol triacetate were blended with a ribbon blender, and then melt-extruded and pelletized with an extruder at a cylinder set temperature of 170 to 210° C. to obtain a lactic acid-based polymer composition for a masterbatch. The pellets were heat-treated with an oven of 60° C. for 6 hours to obtain pellets having crystallinity of 39%. Subsequently, lactic acid-based polymer A and the resulting masterbatch pellets were blended with a Henschel mixer at a ratio of 19:1, and melted with an extruder at a

TABLE 4

|  | Comparative Example 1 | Comparative Example 2 | Comparative Example 3 | Comparative Example 4 |
|---|---|---|---|---|
| Type of anti-blocking agent | silica | same as left | same as left | same as left |
| Average particle diameter of anti-blocking agent (μm) | 0.005 | 0.100 | 0.012 | 0.012 |
| Amount of anti-blocking agent (parts by weight) | 10.0 | 20.0 | 0.05 | 55.0 |
| Type of dispersing agent | no | same as left | same as left | same as left |
| Amount of dispersing agent (parts by weight) | no | same as left | same as left | same as left |
| Type of resin | A | same as left | same as left | same as left |
| Amount of resin (parts by weight) | 100 | same as left | same as left | same as left |
| Particle diameter of resin (μm) | pellet (3 mm × 3 mm) | same as left | same as left | same as left |
| Conditions of heat treatment | 50° C. × 5 hrs | 60° C. × 5 hrs | 60° C. × 8 hrs | 60° C. × 10 hrs |
| Crystallinity (%) | 30 | 39 | 41 | 47 |
| Blending ratio (resin:MB) | 19:1 | 39:1 | 19:1 | 19:1 |
| Molding stability Rate of change in pressure (%) | 5 | 8 | 9 | 6 |
| Dispersibility | X | X | X | X |
| Anti-blocking property | X | ○ | X | ○ |
| Haze (%) | 3.5 | 6.0 | 0.8 | 4.0 |

Comparative Example 5

One hundred parts by weight of lactic acid-based polymer A obtained in Production Example 1, 60 parts by weight of an anti-blocking agent (SiO$_2$ content 99% by weight or more, trade name: Aerosyl 200: made by Nippon Aerosyl cylinder set temperature of 160 to 200° C. to obtain an unstretched film having a thickness of 0.1 mm from a T die on the head of the extruder. The rate of change in the pressure in the molding was 8%. The resulting unstretched film was stretched to 2 times longitudinally and then to 3 times transversely, and heat-treated at 130° C. for 60 seconds. Then, the film was cooled with air of 30° C. to obtain a stretched film having a thickness of approximately 15 μm. The results of evaluation of the resulting stretched film are shown in [Table 5].

Comparative Example 7

One hundred parts by weight of lactic acid-based polymer A obtained in Production Example 1 and 10 parts by weight of an anti-blocking agent ($SiO_2$ content 99% by weight or more, trade name: Aerosyl 130: made by Nippon Aerosyl K.K.) having an average particle diameter of 0.016 μm were blended with a ribbon blender, and then melt-extruded and pelletized with an extruder at a cylinder set temperature of 170 to 210° C. to obtain a lactic acid-based polymer composition for a masterbatch. Subsequently, lactic acid-based polymer A and the resulting masterbatch pellets were blended with a Henschel mixer at a ratio of 19:1, and melted with an extruder at a cylinder set temperature of 160 to 200° C. to obtain an unstretched film having a thickness of 0.1 mm from a T die on the head of the extruder. The rate of change in the pressure in the molding was 16%. The resulting unstretched film was stretched to 2 times longitudinally and then to 3 times transversely, and heat-treated at 130° C. for 60 seconds. Then, the film was cooled with air of 30° C. to obtain a stretched film having a thickness of approximately 15 μm. The results of evaluation of the resulting stretched film are shown in [Table 5].

What is claimed is:

1. A method for producing a lactic acid-based polymer film, which comprises adding 19 to 49 parts by weight of a lactic acid-based polymer to 1 part by weight of a masterbatch lactic acid-based polymer composition to form a molding material, wherein the masterbatch lactic acid-based polymer composition comprises 100 parts by weight of a lactic acid-based polymer and 0.1 to 40 parts by weight of an anti-blocking agent having an average particle diameter of 0.007 to 0.05 μm and 10 parts by weight or less of a dispersing agent, and has a crystallinity of 10 to 60%, and forming the molding material into film at 150 to 230° C.

2. The method for producing a lactic acid-based polymer film as claimed in claim 1, wherein the masterbatch lactic acid-based polymer composition is kneaded, melt-extruded, and pelletized at 150 to 230° C. and then heat-treated at 40 to 100° C. for 2 to 10 hours.

3. The method for producing a lactic acid-based polymer film as claimed in claim 1, wherein after the film formation, the film is stretched to between 1.5 and 5 times at least uniaxially at 30 to 100° C.

4. The method for producing a lactic acid-based polymer film as claimed in claim 3, wherein after the stretching, heat treatment is conducted at 80 to 150° C. for 3 to 120 seconds.

5. The method for producing a lactic acid-based polymer film as claimed in claim 1, wherein the thickness of the film is 5 to 1,000 μm.

* * * * *

TABLE 5

|  | Comparative Example 5 | Comparative Example 6 | Comparative Example 7 |
|---|---|---|---|
| Type of anti-blocking agent | silica | same as left | same as left |
| Average particle diameter of anti-blocking agent (μm) | 0.012 | 0.007 | 0.016 |
| Amount of anti-blocking agent (parts by weight) | 60.0 | 6.0 | 10.0 |
| Type of dispersing agent | A1 | same as left | same as left |
| Amount of dispersing agent (parts by weight) | 10 | 50 | no |
| Type of resin | A | same as left | same as left |
| Amount of resin (parts by weight) | 100 | 100 | 100 |
| Particle diameter of resin (μm) | pellet (3 mm × 3 mm) | same as left | same as left |
| Conditions of heat treatment | 50° C. × 8 hrs | 60° C. × 6 hrs | — |
| Crystallinity (%) | 37 | 39 | 4 |
| Blending ratio (resin:MB) | 19:1 | 19:1 | 19:1 |
| Molding stability Rate of change in pressure (%) | 3 | 8 | 16 |
| Dispersibility | X | ◎ | ○ |
| Anti-blocking property | ○ | X | ○ |
| Haze (%) | 5.0 | 1.5 | 0.9 |

A1: glycerol triacetate